United States Patent
Kazi et al.

(10) Patent No.: US 7,818,091 B2
(45) Date of Patent: Oct. 19, 2010

(54) PROCESS AND DEVICE FOR DETERMINING THE POSITION AND THE ORIENTATION OF AN IMAGE RECEPTION MEANS

(75) Inventors: Arif Kazi, Augsburg (DE); Rainer Bischoff, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 1174 days.

(21) Appl. No.: 10/952,313

(22) Filed: Sep. 28, 2004

(65) Prior Publication Data

US 2005/0131582 A1 Jun. 16, 2005

(30) Foreign Application Priority Data

Oct. 1, 2003 (DE) ................. 103 45 743

(51) Int. Cl.
G05B 15/00 (2006.01)
G05B 19/00 (2006.01)

(52) U.S. Cl. ............. 700/259; 700/254; 700/252; 700/260; 700/262; 700/263; 700/264; 700/246; 700/247; 700/248; 318/568.1; 318/568.11; 901/9; 901/47; 702/86; 702/94; 702/95; 702/163; 396/54; 396/55; 396/233

(58) Field of Classification Search .......... 700/254, 700/252, 259, 262, 263, 260, 264, 246, 247, 700/248; 318/568.1, 568.11; 901/94, 95, 901/86, 163; 702/94, 95, 86, 163; 396/54, 396/55, 233
See application file for complete search history.

(56) References Cited

U.S. PATENT DOCUMENTS 3,936,178 A * 2/1976 Kuehnle ................ 399/158
4,281,342 A * 7/1981 Ueda et al. .............. 348/94
4,305,130 A * 12/1981 Kelley et al. ............ 700/259
4,380,696 A * 4/1983 Masaki ................ 219/124.34
4,402,053 A * 8/1983 Kelley et al. ............ 700/259
4,613,269 A * 9/1986 Wilder et al. ........... 700/259
4,887,223 A * 12/1989 Christian .............. 382/153

(Continued)

FOREIGN PATENT DOCUMENTS

DE 690 03 090 2/1994

(Continued)

OTHER PUBLICATIONS

P. Puget et al., An Optimal Solution for Mobile Camera Calibration, IEEE Comp. Soc. Press. US May 13, 1990, vol. 1.

(Continued)

*Primary Examiner*—Khoi Tran
*Assistant Examiner*—Jorge O Peche
(74) *Attorney, Agent, or Firm*—Wood, Herron & Evans, LLP

(57) ABSTRACT

A process and a device are provided for determining the pose as the entirety of the position and the orientation of an image reception device. The process is characterized in that the pose of the image reception device is determined with the use of at least one measuring device that is part of a robot. The device is characterized by a robot with an integrated measuring device that is part of the robot for determining the pose of the image reception device.

25 Claims, 9 Drawing Sheets

U.S. PATENT DOCUMENTS

| | | | | |
|---|---|---|---|---|
| 5,168,528 | A | * | 12/1992 | Field, Jr. .................... 382/103 |
| 5,268,996 | A | * | 12/1993 | Steiner et al. ............... 345/426 |
| 5,297,238 | A | * | 3/1994 | Wang et al. ................. 700/259 |
| 5,499,306 | A | * | 3/1996 | Sasaki et al. ................ 382/291 |
| 5,742,521 | A | * | 4/1998 | Ellenby et al. .............. 702/127 |
| 5,835,693 | A | * | 11/1998 | Lynch et al. ................ 345/473 |
| 5,876,325 | A | * | 3/1999 | Mizuno et al. .............. 600/102 |
| 5,880,956 | A | * | 3/1999 | Graf ............................ 700/86 |
| 5,905,850 | A | * | 5/1999 | Kaveh ........................ 700/259 |
| 5,956,417 | A | * | 9/1999 | Pryor ......................... 382/154 |
| 6,044,308 | A | * | 3/2000 | Huissoon ................... 700/166 |
| 6,157,873 | A | * | 12/2000 | DeCamp et al. ............ 700/253 |
| 6,321,137 | B1 | * | 11/2001 | De Smet ..................... 700/245 |
| 6,507,359 | B1 | * | 1/2003 | Muramoto et al. ........... 348/47 |
| 6,587,752 | B1 | * | 7/2003 | Saito .......................... 700/264 |
| 6,611,617 | B1 | * | 8/2003 | Crampton ................... 382/154 |
| 6,615,112 | B1 | * | 9/2003 | Roos .......................... 700/254 |
| 6,763,284 | B2 | * | 7/2004 | Watanabe et al. ........... 700/264 |
| 6,816,755 | B2 | * | 11/2004 | Habibi et al. ............... 700/259 |
| 7,336,814 | B2 | * | 2/2008 | Boca et al. .................. 382/141 |
| 2002/0082498 | A1 | * | 6/2002 | Wendt et al. ................ 600/411 |
| 2003/0048459 | A1 | * | 3/2003 | Gooch ........................ 356/620 |
| 2003/0144765 | A1 | * | 7/2003 | Habibi et al. ............... 700/259 |
| 2003/0179308 | A1 | | 9/2003 | Zamorano et al. |
| 2004/0172164 | A1 | * | 9/2004 | Habibi et al. ............... 700/245 |
| 2004/0189631 | A1 | | 9/2004 | Kazi et al. |
| 2007/0216332 | A1 | * | 9/2007 | Lambert et al. .......... 318/568.1 |

FOREIGN PATENT DOCUMENTS

| | | |
|---|---|---|
| DE | 199 31 676 | 1/2001 |
| DE | 101 11 130 A1 | 9/2002 |
| DE | 10305384 A1 | 8/2004 |
| EP | 1 365 894 B2 | 12/2003 |
| WO | WO 90/08939 | 8/1990 |
| WO | WO03/064116 A2 | 8/2003 |

OTHER PUBLICATIONS

Roger Tsai et al., A New Technique for Fully Autonomous and Efficient 3D Robotics Hand/Eye Calibration, IEEE Transactions and Robotics and Automation 5 Jun. 1989, No. 3.

* cited by examiner

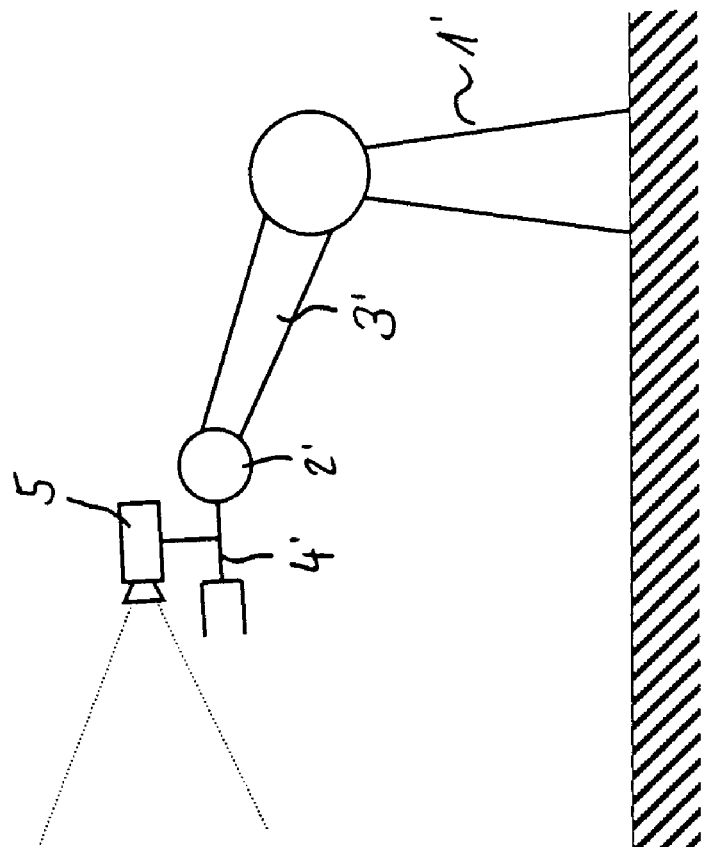
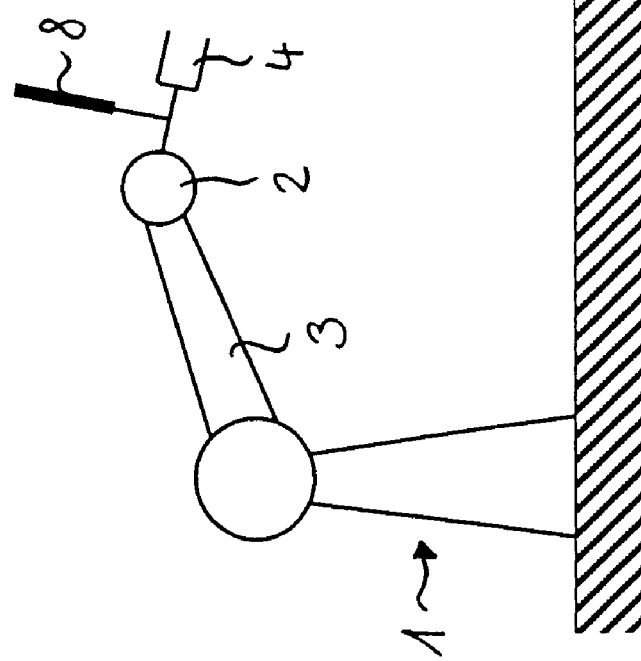
Fig. 6

PROCESS AND DEVICE FOR DETERMINING THE POSITION AND THE ORIENTATION OF AN IMAGE RECEPTION MEANS

CROSS REFERENCE TO RELATED APPLICATIONS

This application claims the benefit of priority under 35 U.S.C. §119 of DE 103 45 743.7 filed Oct. 1, 2003, the entire contents of which are incorporated herein by reference.

FIELD OF THE INVENTION

The present invention pertains to a process and a device for determining the pose as the entirety of the position and orientation of an image reception means.

The present invention pertains, in particular, to a process and a device for determining the position and the orientation of an image reception means, which receives images of the real environment, into which virtual information, such as computer-generated or even separately recorded and stored information, is also inserted, as this happens in case of so-called "augmented reality" or AR. In automatic handling devices and robots, which are preferably those according to the standard EN ISO 8373 within the framework of the present invention, the position and the orientation are summed up, as will also be done below, as pose. Augmented reality is used, for example, to provide workers with instructions for complicated assembly or maintenance operations. In addition, robot programming can be supported by augmented reality, as this is described in the German Patent Application 103 05 384.0.

BACKGROUND OF THE INVENTION

Especially in case of the latter application, the creation of augmented reality by the spatially precise insertion of virtual objects or information, as of a robot path, a reference system of coordinates, a virtual environment or an environment recorded in advance at another location, of virtual tools or the like, is of the greatest importance, because the spatial position itself contains the essential information.

The continuous, exact determination of the position and orientation (pose) of a corresponding image recording means is therefore necessary within the framework of tracking. The image recording means may be a camera or an optical recording means, such as a semitransparent mirror or the eyeglasses of a viewer, into which the virtual information is inserted.

Marks, which can be detected and recognized by the camera or a connected image processing system, are now frequently arranged in the real environment in spatially exactly defined positions to determine the pose of a camera. The pose of the camera in the space is inferred from the known position based on the camera image. However, the accuracy that can be achieved in the determination of the pose is limited by the optical quality of the camera, the quality of the calibration of the camera, the accuracy of the determination of the position of the marks and the precise arrangement of the marks at known sites in the world or environment and the quality of the image processing. Arranging a sufficient number of optical marks in real manufacturing environments and measuring them—manually—before the beginning of a robot programming is very complicated.

If a model of a robot environment exists, it is possible in certain cases to do without the arrangement of marks, because the determination of the site of the image reception means, the camera—the so-called tracking—is carried out now by the comparison of the environmental features recognized from the camera image and features stored in an environment model. On the one hand, such a procedure has not hitherto been embodied in a version fit at least for practical use and, on the other hand, it might not reach high accuracies.

Furthermore, it is very well known that the determination of the pose of the image reception means can be carried out by means of additional sensor systems with mechanical, optical, acoustic, magnetic, and inertia- and/or laser-based sensors. Such a procedure is associated with high costs. In addition, the range of action of the viewer is greatly limited in case of mechanical sensor systems, such as cross-wire systems. There must be a direct visual contact between the transmitter and the receiver in case of optical or acoustic systems, which is usually hardly guaranteed in real manufacturing environments. Moreover, time-consuming calibration of the additional sensor systems is necessary, but hardly practicable, before the beginning of the programming.

SUMMARY OF THE INVENTION

The basic object of the present invention is therefore to provide a process and a device for determining the pose (position and orientation) of an image reception means, which can be embodied without excessively high costs while offering high accuracy of the determination of the pose.

This object is accomplished according to the present invention with a process of the type described in the introduction, which is characterized in that the pose of the image reception means is determined with the use of at least one measuring means that is part of an automatic handling device. To accomplish the object, the device of the type described in the introduction provides an automatic handling device with integrated measuring means as part of the automatic handling device for determining the pose of the image reception means.

The present invention makes it possible to determine the pose of the camera in real time i.e., at least with the videoactive rate, which makes possible the simple and inexpensive visualization of information associated with any particular pose of the camera, especially internal information of the automatic handling device.

To achieve the goal of an augmentation of control information that credibly takes place in real time by means of a video see-through AR system, it is necessary to rapidly determine the pose of a camera and to superimpose virtual objects that are of interest to a viewer to the video image actually recorded. The tracking for the continuous determination of the camera pose is achieved by means of angle encoders and the knowledge of the forward kinematics of the robot at which the camera is mounted. The information to be superimposed may come from the robot control of the camera-holding robot itself or from other computers, which could store "interesting" information (e.g., from other machine or robot controls). When visualizing information coming from other controls, it is necessary to know the spatial relationship between the original systems of coordinates of the controls, and it must be ensured that all controls disclose their information concerning a system of coordinates (e.g., the world system of coordinates of the camera-guiding robot). The relationship between the system of coordinates of the camera and the system of coordinates of the flange must be known, e.g., by calibration, for the transformation into the system of coordinates of the camera of the camera-guiding robot.

The robot's own measuring means, which is integrated in same, preferably contains the angle sensors in the axle drives of such a robot.

In a preferred embodiment, the image reception means is a camera, which may be arranged either on an automatic handling device or robot programmed to perform a task, preferably, e.g., at the hand flange thereof or at a tool connected thereto or on an additional robot present in addition to the robot programmed to perform a task.

Provisions are made in a preferred embodiment of the present invention for the pose data that determine the pose of an image reception means and are obtained by at least one measuring means that is part of an automatic handling device to be assigned to the images recorded in the particular pose by the image reception means. In terms of device, the present invention provides for this purpose an assigning means for assigning pose data that determine the pose of an image reception means and are obtained by at least one measuring means that is part of an automatic handling device with the particular images recorded in the particular pose by the image reception means.

While the image reception means may be, in principle, an optical display, it is preferably a (video) camera. According to a preferred variant specific virtual information, especially of the automatic handling device, is inserted into images recorded by the image reception means at the correct time and/or in the correct position and is provided (images recorded by the image reception means) a means for inserting specific virtual information, especially of an automatic handling device, at the correct time and/or in the correct position.

Provisions may be made in a preferred embodiment of the present invention for a camera to be used at an automatic handling device, which is programmed especially to perform tasks, for a camera to be used on an automatic handling device located adjacent to an automatic handling device programmed to perform tasks, and/or for the pose of an image reception means to be determined by means of a measuring means connected with an automatic handling device. The offset usually present between the camera and a known site at the handling device, such as a hand flange or TCP, can be determined in the known manner, for example, by measurement or also in a manner described below.

Provisions are made in other preferred embodiments of the present invention for the pose of an automatic handling device in the space to be determined by means of at least one mark arranged in the space as well as at least one measuring means, such as a camera or a sensor, which is arranged at the robot, or for the pose of an automatic handling device in the space to be determined by means of at least one mark arranged at the automatic handling device as well as at least one measuring means, such as a camera or at least one sensor, which is arranged independently from the automatic handling device.

For calibration, the camera can thus detect artificial marks in the form of an image in different poses from a plurality of positions, as a result of which the positions thereof in relation to the marks and, as a result, positions of the robot or, more precisely, of the flange or TCP (Tool Center Point), which are determined by measuring means that is part of the automatic handling device—even if the offset between the camera and the flange or TCP is at first unknown—, the offset and ultimately the position in the space can be determined. The position of the camera, more precisely, of the system of coordinates of the camera, in the space can be determined from each measured pose. The reference (offset) between the system of coordinates of the camera and the system of coordinates of the flange can thus be determined based on the knowledge of the position of the robot flange at that point in time and the averaging over a plurality of measurements.

Provisions are made according to a preferred embodiment of the present invention for the pose of an automatic handling device relative to another one to be determined by means of a mark arranged on an automatic handling device and a measuring means, such as a camera or a sensor, which is arranged at the other automatic handling device. The camera and the robot carrying same with the robot's internal measuring means as well as AR system components form one unit according to the present invention. A second robot can be considered to be part of a working cell, whose real conditions are to be augmented with information from that working cell, e.g., the path programmed at the second robot. It is necessary for this that the first robot knows where it is located in relation to the second robot. This relationship can be established by calibration. After the calibration, it is easy for the robot control of the first robot to transform the data from the robot control of the second robot into the image coordinates of its camera and to augment the transformed data into the image recorded.

The data to be augmented in the above-described manner are supplied by the control of the second robot. Instead of or in addition to this second robot, a machine tool could be located in the working cell. Machine tools also have a control, and many possibilities can be imagined for profitably visualizing control information, e.g., systems of coordinates of the machine control, objects to be processed virtually within the framework of a test run, and virtual tools, which are superimposed to real tools in the interior space of the machine tool.

The second robot, which guides the camera, can look, in general, toward another working space, in which many other controls may be active, e.g., robot controls and other machine controls, whose information is to be visualized. Contrary to the visualization of internal information of the robot within the framework of augmented reality, information that originates from controls other than the own control is consequently visualized here. The controls must be interlinked for this in a real-time-capable manner in order for the information to be able to be inserted keeping pace with the changes in the reality. Furthermore, it is necessary to form a model of the working cell, which in turn entails a calibration in order for credible augmentation to be possible.

The guiding of the camera by the robot may be active or passive. Active means that the robot runs a program ("camera travel" over a certain scene) or (e.g., the mounted camera) is positioned automatically by means of a sensor system. Passive means that a human operator, who would like to use the AR information for his purposes, positions the robot such that he obtains the desired information. This positioning may take place by guiding the robot (in the so-called manipulator operation, in which, e.g., a force-torque sensor, by means of which desired directions of movement are imposed, is arranged at the robot, or by means of the operating device (e.g., by pressing the travel buttons or actuating the 6D mouse).

Another peculiar feature of the present invention is that the robot may assume a partly active and partly passive role. While a user guides the robot manually or moves same by means of travel buttons, the degrees of freedom of movement of the robot can be limited as desired, e.g., to a space in which the robot can move with all six degrees of freedom, or to any desired plane, path or even to a point only, around which the TCP can be oriented. Thus, any desired camera travel can be carried out by means of the robot manually in a parameterized manner, e.g., manual guiding of the robot on a permanently preset path through the space, in which case the degrees of freedom of orientation could be released.

If the guiding of the camera is taken over by a second robot, which looks toward the first robot or the working space processed by the first robot, this is a special form of the present invention, in which a robot actively moves a camera in order to make it possible to insert virtual objects into the camera image in the correct position. The peculiar feature of this is that the two robots are related to the same system of coordinates and can easily exchange information that is essential for visualization via their respective controls. This facilitates the insertion of the desired internal information of the robot. The robots are calibrated with one another for this purpose. The robots can also be guided/moved in such a way as to avoid collisions when the controls are connected with one another, which is not possible with conventional, purely mechanically operating AR tracking systems. If robot systems with more than six degrees of freedom are used, the redundant degrees of freedom can be used to evade collisions and singularities (which are very easily entered in case of hand-guided robots) and to evade obstacles. The control of the camera-guiding robot could have collision avoidance algorithms, which automatically ensure that the robot will not collide anywhere while being guided manually. This is a great advantage over purely passive systems, because the user must always ensure that the system does not collide.

Moreover, the camera may be arranged at an operating device having a video display, which said operating device is worn by a user. Especially if the image reception means is worn by a user, it may also be an optical display, such as a semitransparent mirror or glasses worn by a user, into which the virtual data or objects are inserted.

In these cases, in which the user wears the image reception means, an (additional) measuring means is connected with one of the above-mentioned automatic handling devices or robots, which said (additional) measuring means may be, for example, a camera or may also have optical, acoustic or mechanical sensors, by means of which the exact position of the image reception means being worn by the user relative to the measuring means connected with the robot can be determined, as a result of which the site of the image reception means being worn by the user in the space can again be determined with the use of the measuring means belonging to the automatic handling device. The image reception means, if it is now arranged separately from one of the automatic handling devices or robots, is preferably provided with marks, especially optical marks but also acoustic marks, in which case a corresponding measuring means is used.

Other advantages and features of the present invention will appear from the claims and the following description, in which exemplary embodiments of the present invention are specifically explained with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a schematic view of a workpiece-processing robot provided with reference marks and with an additional robot having an image reception means in the form of a camera;

DESCRIPTION OF THE PREFERRED
EMBODIMENTS

Figure 1:
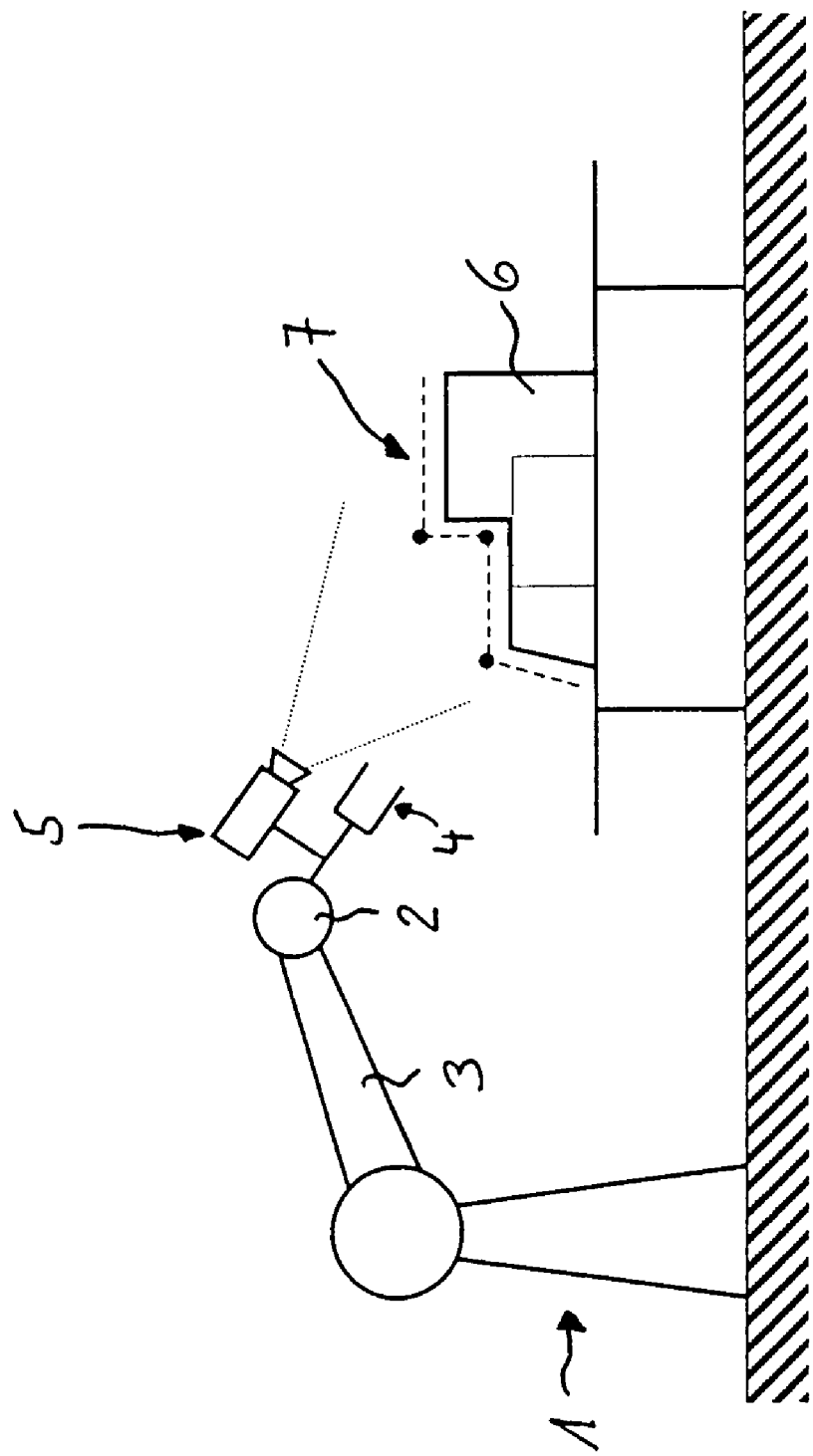
FIG. 1 is a schematic view of a workpiece-processing robot provided with an image reception means in the form of a camera.

Referring to the drawings in particular, FIG. 1 schematically shows, as an example of an automatic handling device or robot, a multiaxial industrial robot 1, which is provided with a tool 4 in its hand area 2 at the front end of its robot arm 3. An image reception means 5 in the form of a camera is arranged at the tool 4 in the exemplary embodiment being shown. Furthermore, workpieces 6 as well as a programmed robot path 7, which is to be traveled by the robot and is associated with the workpieces 6, are shown.

Not shown is a display associated with an operator or user with a display of the real image recorded by the image reception means 5 and with the insertion of virtual information, especially image information, assigned to the real image in the correct position.

To display augmented objects by insertion in the correct position on the display, the position of the image reception means 5 (camera) in the space must be known. This can be determined with high precision in case of the device shown in FIG. 1 based on the integrated measuring means belonging to the robot, such as especially angle sensors of the axle drives.

Figure 2:
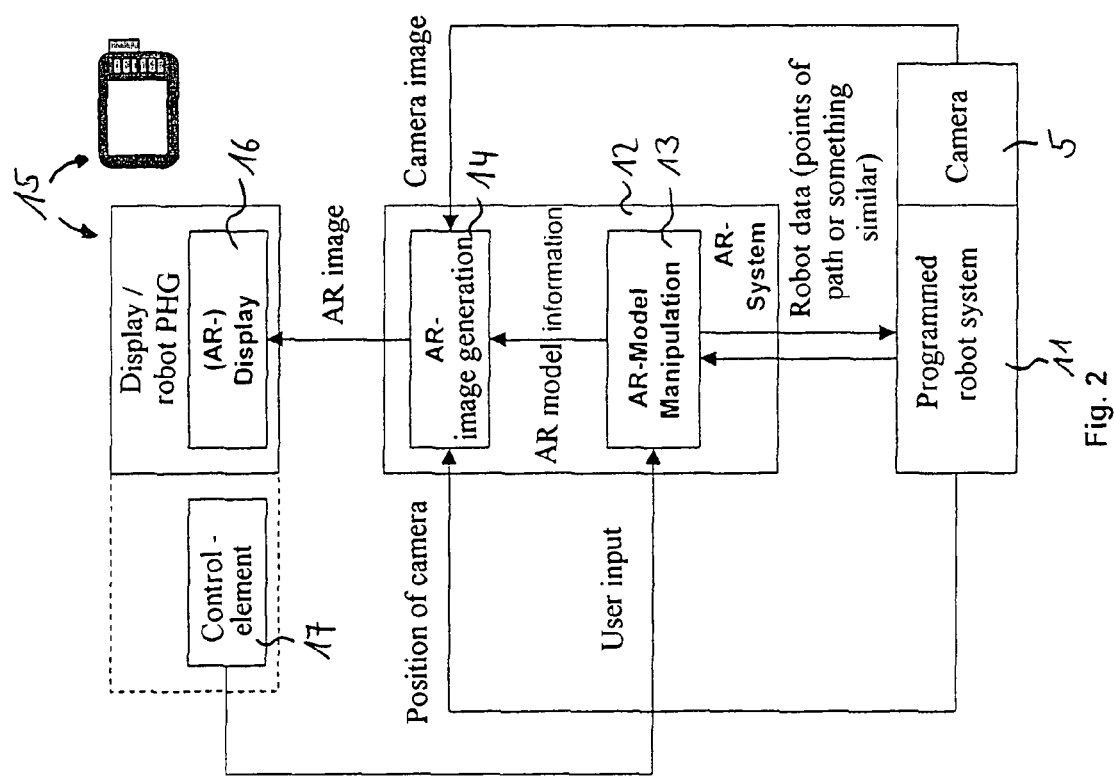
FIG. 2 is a block diagram with the components and the flow of information in the subject of FIG. 1.

According to the block diagram shown in FIG. 2, a device suitable for the subject of FIG. 1 has a programmed robot system 11 containing the robot 1 with the image reception means 5 mentioned in the form of the camera. Furthermore, an augmented reality system 12 with a module for the AR model manipulation 13, on the one hand, and, on the other hand, an AR image generating means 14 are provided. The display 15 held by the user has control elements 17 besides a display or a display 16.

The information on the site and orientation of the camera, which was obtained in the above-described manner (called "pose" together), is fed by the programmed robot system 11 into the image generation component 14 of the AR system 12, as is the camera image from the camera 5. The objects to be augmented, for example, points of the path to be traveled or spatial positions of systems of coordinates, are made available to the AR system by the robot control. The AR image generated as a whole (with real image detail and augmented information inserted into same) is displayed for the user on the display 16 of the display 15. Manipulation of the augmented objects in space, i.e., for example, a relative displacement of these objects in relation to the real image, is possible by means of the control elements 17. These user inputs are detected and processed by the AR model manipulation component 13 of the AR system. The manipulated information pertaining to it due to the changing of the augmented object can be written back into the robot control if needed.

To view an AR scene, e.g., the augmented path of the robot tool center point (TCP) according to the running of a robot travel program, the user can move the robot 1 manually such that the camera 5 will show the image detail of interest. Collision can be avoided by automatic monitoring of the path or also by the user.

Figure 3:
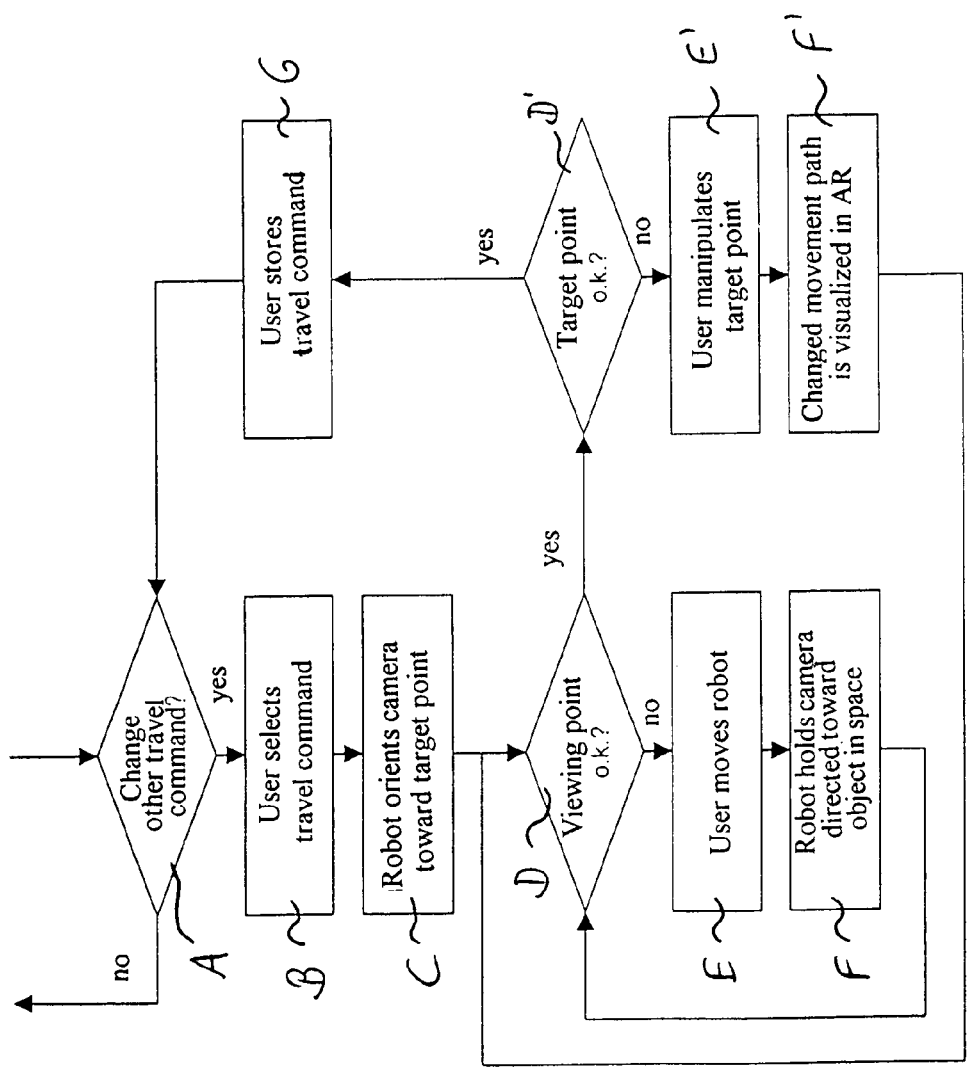
FIG. 3 is a flow chart for changing travel commands during the determination of the position of a camera connected with a robot.

If the course of a path is to be changed by changing travel commands (step A in FIG. 3), a user selects an object to be visualized in augmented reality, such as a point of the path within the robot program (step B in FIG. 3). The robot 1 will then automatically first change the orientation of the camera 5 such that the object to be visualized, such as the selected point of the path, will be shown in the middle of the screen 16. The robot should now set the camera pose (position, orientation) such that the view on the screen 16 coincides with the reality, i.e., "top" on the screen also corresponds to "top" in reality. If the viewing point does not appear to be suitable to the user (step D), the user moves the robot manually in order to view the augmented object from another perspective, for example, by means of the corresponding control elements 17 of the manual robot programming device 15 according to step E, and the robot will now hold the camera directed toward the object (step F) until the viewing point appears to the user to be suitable (again step D).

The robot now always orients the camera such that [the] object selected for augmentation appears in the middle of the screen. The user may optionally manipulate the spatial position and the orientation of the augmented object in the known manner, for example, corresponding to German Patent Application No. 103 05 384.0, which is also made the subject of the disclosure of this application to its full extent, and change the viewing angle toward the augmented object as desired.

Like the viewing point, the target point can also be changed for this if it does not correspond to the desired one (step D') by the target point being manipulated by the user (step E') and by the changed path of movement being visualized in the augmented reality (step F), the manipulation of the viewing point and the target point being optionally able to be performed alternately. If both are set in the suitable manner, the user can store the corresponding travel command of the robot (step E). If additional travel commands are to be changed, this is carried out in the above-described manner or the corresponding process is changed (step A).

The user is relieved by the above-described, automatically supported process, because he must control only three of the total of six spatial degrees of freedom himself, namely, those that are relevant for him, such as the panning of the camera, on the one hand, in two directions, as well as the distance from the augmented object. The "targeting" of the augmented object is assumed by the robot with its other degrees of freedom itself.

Due to the procedure described on the basis of the above exemplary embodiment, spatial information from the robot control can be efficiently visualized, such as the course of the path of the tool center point during the running of a robot program or the like.

Figure 4:
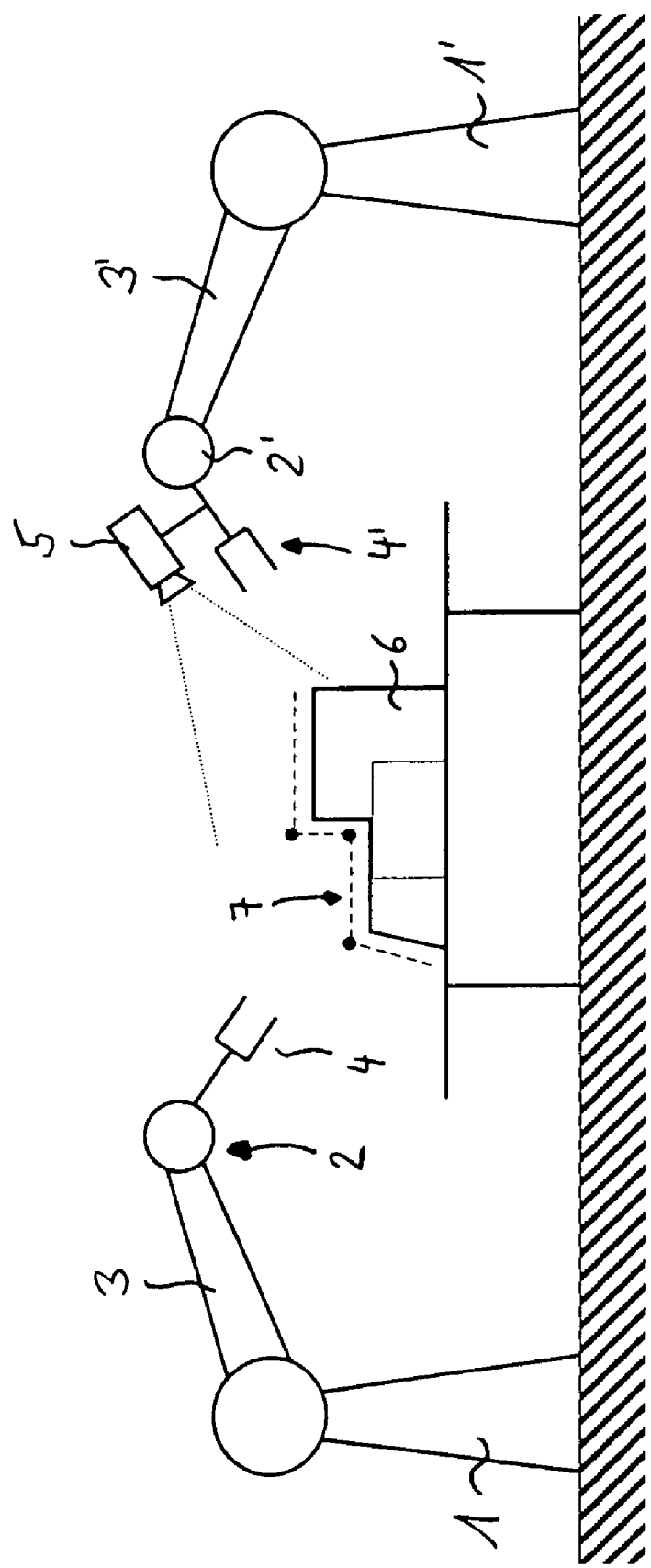
FIG. 4 is a schematic view of a device according to the present invention with an additional, adjacent robot, which is provided with an image reception means and is provided in addition to a workpiece-processing robot.

While the image reception means in the form of a camera is arranged on the robot itself, which is programmed to perform working steps, in the embodiment of the device according to the present invention as shown in FIG. 1, an additional robot 1' is provided in addition to this robot in the embodiment according to FIG. 4 in the vicinity of the first robot 1, which carries the image reception means in the form of a camera on a free mounting flange. Besides the additional robot shown, other robots with additional image reception means may be provided as well. As a result, certain pieces of information, for example, the pose (position, orientation) of the tool center point can be better visualized at the working robot itself, because the real objects, such as workpieces 6, can be viewed independently from the pose of the working robot. To determine the distance of the two (or more than two) robots, it is possible to additionally use the camera located at a robot, if the distance and the direction of the locations of the two robots 1, 1' relative to one another are known, the position of the camera 5 in relation to the working robot system can in turn be inferred from the axis angles and the geometric data of the camera-guiding robot system and the point at which the camera is arranged.

Figure 5:
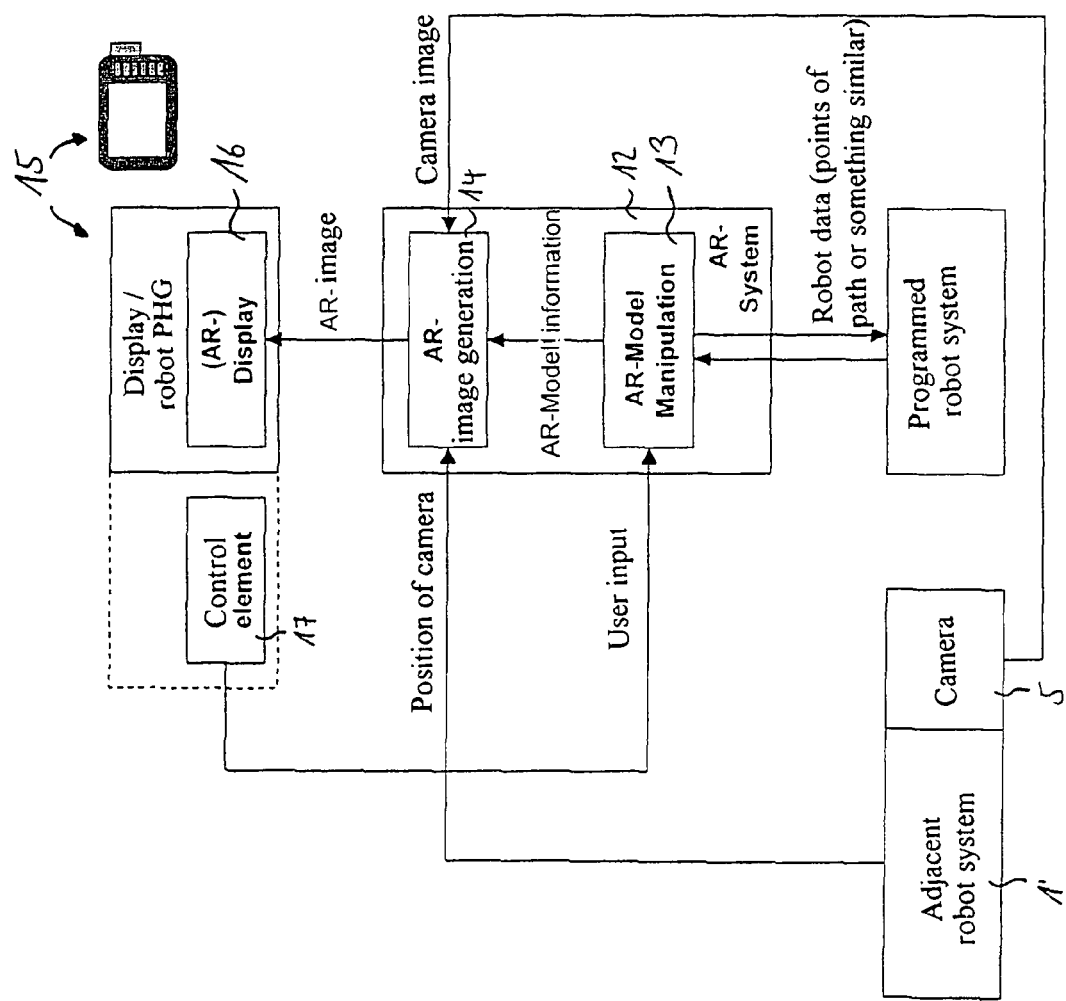
FIG. 5 is a block diagram of the components and the flow of information with the subject of claim 4.

FIG. 5 shows a block diagram for the device according to FIG. 3, wherein the same reference numbers are used as in FIG. 2. The only difference from FIG. 2 is that corresponding to FIG. 4, the additional robot system 1' is present and this is equipped with the camera 5, and both the position of the camera of the robot system 1' and the camera image are fed from this additional robot system into the AR image generation component of the AR system, to which the spatial position of the systems of coordinates, points of the paths or the like are made available from the working robot system 1.

The block diagram and the flow of information otherwise correspond to these described with reference to FIG. 2.

As was mentioned above, a markedly better angle of view to the objects to be augmented can be obtained by means of an additional robot carrying an image reception means or a plurality of adjacent robots than in the embodiment according to FIGS. 1 and 2. To visualize an object from different directions of view, switching between different camera views is optionally possible. An automatic system-supported operation can be embodied in a manner similar to that described with reference to FIG. 5, which can also be referred to for the embodiment according to FIGS. 4 and 5.

If the position and the orientation of the robots relative to one another are unknown, a corresponding calibration is to be performed. To illustrate this, the two robots 1 and 1' are shown once again in FIG. 6. The first robot 1 carries one or more reference marks 8, while the additional, adjacent robot 1' carries the camera 5. The latter robot 1' is moved such that the camera 5 points toward the mark 8 at the first robot 1. The position of the mark 8 in relation to the camera 5 is determined from the camera image by means of prior-art processes. The positions and the orientations of the two robots 1, 1' relative to one another can be determined from the known pose of the mark 8—based on the known arrangement of this pose at the robot on the robot hand 2 or at a tool 4 connected to the robot hand and based on the integrated measuring means, such as angle sensors of the axle drives, relative to the foot of the robot 1 and the pose of the image reception means 5 relative to the foot of the adjacent, camera-guiding robot 1', which latter pose is known in a corresponding manner. To increase the accuracy, the process can be carried out iteratively with changing poses of the two robot systems 1, 1'.

Figure 7:
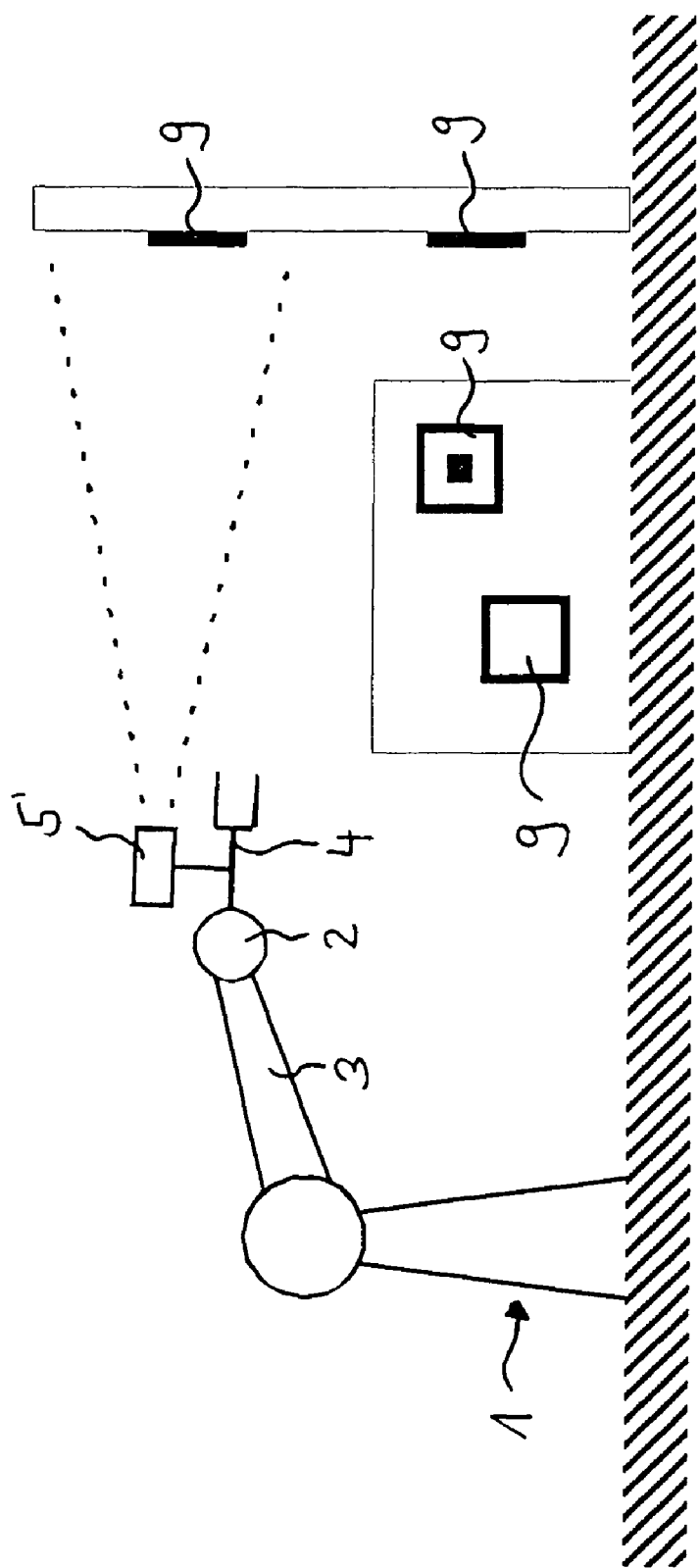
FIG. 7 is a schematic view of a workpiece-processing robot provided with a measuring means as well as with stationary marks.

The use of marks 9 arranged permanently in the space for determining the pose of an image reception means of the augmented reality is assumed in the embodiment according to FIG. 7. The pose of the individual marks 9 (position and orientation) in the space must be known for this. This is likewise determined with the use of the measuring means integrated within the robot, such as the angle sensors of the axles, in the manner shown in FIG. 7.

The type of the marks 9 may differ. As is schematically outlined in FIG. 7, these may be graphic, optically detectable images or they may be acoustic or other marks. The type of the marks determines the measuring means 5 arranged at the robot. In case of acoustic marks in the form of sound waves, the measuring means may be a microphone or a microphone array. In case of optical marks, which may optionally be created in color, the measuring means 5' is a camera, in which case this camera may be identical to the camera that is used to generate the augmented image at the work site, i.e., the camera 5 according to FIGS. 1 and 3. The measuring means detects the marks in their position and orientation relative to the measuring means itself. The site of the measuring means is detected in the space, as was said, by the measuring means (angle sensors) integrated in the robot, whereby the site of the marks in the space is determined as well.

After the robot has been positioned approximately in such a way that a mark is located in the range of detection of the measuring means, the robot can move for this purpose the measuring means systematically through the space, while the measuring means seeks to detect a mark. If a mark is detected by the measuring means, the position of this mark relative to the measuring means is determined. The position of the measuring means relative to a reference point of the robot, such as the low end of the robot, can be determined by a position measurement of the angle-measuring systems along the robot axes and a suitable robot model. The position and the orientation of the marks in the space relative to the reference point of the robot can be determined by a suitable addition of the measuring results. If the location of the robot within a stationary system of coordinates is known, the position of the marks can also be determined relative to this stationary system of coordinates.

In case of a powerful measuring means, the position can be recognized during the automatic searching movement or positioning movement. As an alternative, the robot can stop after having detected a mark in order to perform the determination of the relative position of the marks in relation to the measuring means in the pivoted-out inoperative position. To carry out the determination of the position in the range of highest accuracy of the measuring means, the robot can approach the mark by an image-based control, after having detected a mark, such that one or more measuring positions are assumed such that exact determination of the position can be performed.

If the position of the robot within the space is unknown, the position of the marks relative to one another can be determined if the low end of the robot does not change between the individual measurements of the different marks. Thus, the robot can be used on a mobile carriage, which is stopped in the space for the purpose of measuring the mark. If the range of the robot is insufficient, overlapping of the range of measurement and consequently measurement of the marks in the entire space can be achieved by displacing the carriage in the space.

Different measuring methods can be combined with one another for the determination of the position in the preferred embodiment. One part of the measuring means may be designed to recognize marks from a greater distance, such as a camera with a wide-angle lens, and another measuring means, e.g., an infrared-based range finder, can be used for the exact orientation of the measuring means before the mark and for measuring same.

Figure 8:
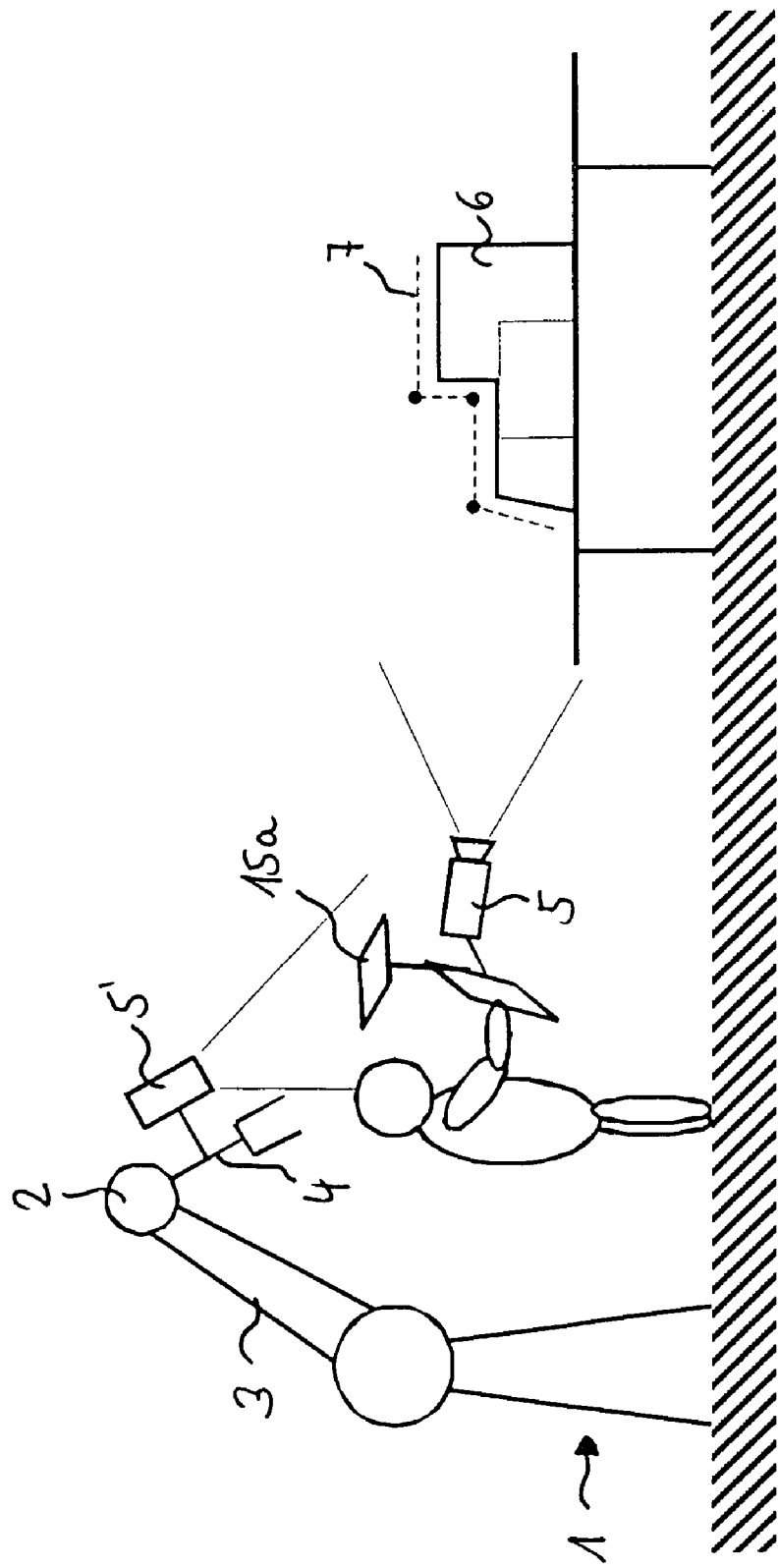
FIG. 8 is a schematic view of an image reception means being worn by a user and of a robot provided with a measuring means.

FIG. 8 shows another embodiment of the device according to the present invention. This device has an operating device 15, which is provided with a camera 5 and can be worn by the user. The operating device has a display 16 as well as control elements 17 in the manner described with reference to FIG. 2. The image recorded by the camera 5 is shown on the display 16 together with the augmented information generated by the AR system.

As a result, the user himself can assume, together with the display, any desired position in relation to the world to be viewed, especially the workpieces. To insert AR information correctly, it was, however, necessary to know the position of the AR display held by the user and of the camera connected thereto in the space. To determine this [position], the robot again carries a measuring means, which can determine the position of the AR display relative to the measuring means, as was described with reference to FIG. 7. The position of the measuring means can again be determined from the position measuring system of the robot in the manner described. The position of the AR display in the space is thus also known and the AR information can be inserted in the correct position.

The above-mentioned measuring means described with reference to FIG. 7 may be used as measuring means. The robot-guided measuring means can track the AR system or a measuring aid attached thereto, such as a reference mark 15a, in the space automatically. While the user is moving in the space with the AR display, the robot positions the measuring means in the space such that optimal view of the reference mark 15a is guaranteed in the sense of the measuring process. This positioning may take place continuously or also intermittently. A model of the environment and/or additional sensors arranged at the robot or the environment can now help the robot avoid collisions with the environment or the user.

Thus, FIG. 8 shows a special form of a robot-camera system as an actively moved AR tracking system. The camera arranged at the robot sends signals to the robot control, which automatically position the robot together with the camera such that the operating device being held by the user can be optimally recognized and tracked. "Optimally recognized" means that the position and the orientation of the camera connected with the operating device can be determined. To simplify the tracking problem, a readily recognizable mark, which can be recognized by the camera being moved actively with the robot without difficulty and tracked over space and time, may be arranged at the operating device.

Figure 9:
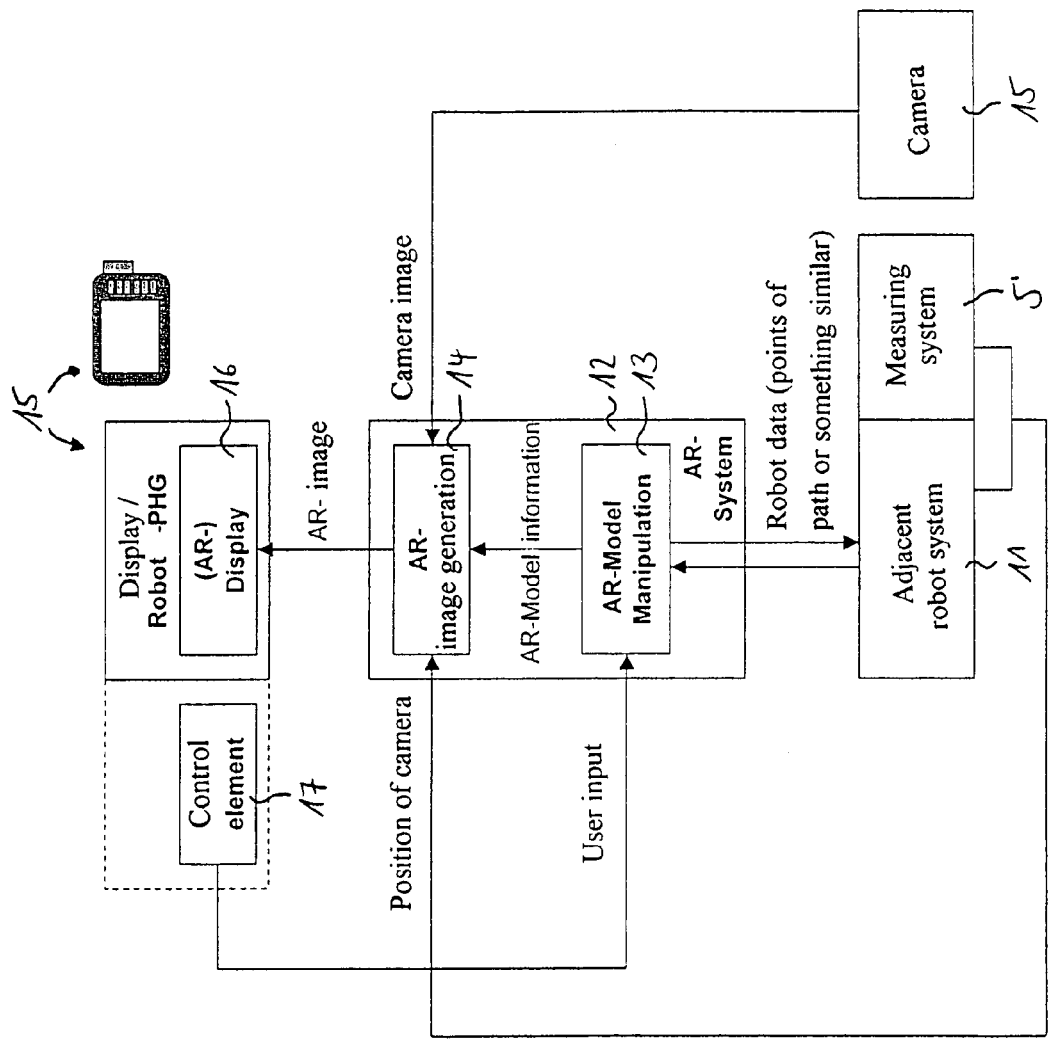
FIG. 9 is a block diagram with the components of the flow of information in the subject of FIG. 8.

FIG. 9 shows a block diagram of the device according to the present invention as is shown in FIG. 8. Elements that are identical to those of the device shown in FIGS. 2 and 5 are designated by the same reference numbers. The image recorded with the camera as well as the position of the camera, which is determined by the measuring means 5 and the integrated measuring system of the robot 11, are sent to the AR image generating means. Reference is otherwise made to the description of FIGS. 2 and 5.

While specific embodiments of the invention have been shown and described in detail to illustrate the application of the principles of the invention, it will be understood that the invention may be embodied otherwise without departing from such principles.

The invention claimed is:

1. A process for determining the pose as the entirety of the position and the orientation of an image reception means, the process comprising:
   providing an image reception means;
   recording an image with said image reception means;
   providing an automatic handling device, said automatic handling device comprising a measuring means;
   determining the pose of the image reception means with said measuring means of said automatic handling device;
   providing an augmented reality system, said augmented reality system comprising an image-generating component;

delivering said determined pose of said image reception means and said recorded image into said image-generating component of said augmented reality system;

superimposing a virtual image on said recorded image in said augmented reality system to form a superimposed image;

displaying said superimposed image via said augmented reality system;

the user selecting an object in said superimposed image;

changing traveling commands of said automatic handling device with said augmented reality system such that an orientation of said image reception means corresponds to a position of said selected object, wherein said selected object is arranged in a center position of said recorded image of said image reception means when said orientation of said image reception means corresponds to said position of said selected object;

manually moving said automatic handling device to view the selected object from another perspective when the viewing point of the selected object is not suitable;

maintaining the image reception means with the automatic handling device in a manually selected orientation when the viewing point is suitable; and storing the traveling commands.

2. A process in accordance with claim 1, wherein the pose of the image reception means is determined via angle sensors located in axle drives of said automatic handling device, said automatic handling device being a robot.

3. A process in accordance with claim 1, wherein said measuring means obtains pose data, said measuring means determining the pose of said image reception means, said pose data being assigned to the images recorded in a particular pose by said image reception means.

4. A process in accordance with claim 1, wherein said augmented reality system inserts virtual information of said automatic handling device into images recorded by the image reception means.

5. A process in accordance with claim 1, wherein an optical display is used as the image reception means.

6. A process in accordance with claim 1, wherein a camera is used as the image reception means.

7. A process in accordance with claim 6, wherein the camera is used at said automatic handling device, which is programmed especially to perform tasks.

8. A process in accordance with claim 6, wherein a camera is used on another automatic handling device located adjacent to said automatic handling device programmed to perform tasks.

9. A process in accordance with claim 1, wherein said measuring means is connected to said automatic handling device.

10. A process in accordance with claim 1, wherein the pose of said automatic handling device in the space is determined by means of at least one mark arranged in the space as well as at least one said measuring means arranged at a robot, such as a camera or a sensor.

11. A process in accordance with claim 1, wherein the pose of said automatic handling device in the space is determined by means of at least one mark arranged at said automatic handling device as well as at least one said measuring means arranged independently from said automatic handling device, such as a camera or at least one sensor.

12. A process in accordance with claim 1, wherein the pose of said automatic handling device relative to another automatic handling device is determined by means of a mark arranged on said automatic handling device and said measuring means, such as a camera or a sensor, which is arranged at said another automatic handling device.

13. A process in accordance with claim 1, wherein combining said recorded image with said virtual image to form said combined image includes overlaying said virtual image on said recorded image.

14. A device for determining a pose as the entirety of a position and an orientation of an image reception means, the device comprising:

an automatic handling device with a measuring means integrated with said automatic handling device for determining the pose of the image reception means, said image reception means recording an image;

an augmented reality system comprising an image-generating component, said image-generating component receiving said determined pose of said image reception means and said recorded image, wherein a virtual image of said augmented reality system is superimposed on said recorded image is to form a superimposed image, said augmented reality system generating an image reception means orientation signal when a position of a selected object in said superimposed image is changed in said augmented reality system, said image reception means receiving said image reception means orientation signal such that said image reception means is moved to a selected object position, said selected object position corresponding to said position of said selected object in said superimposed image, said selected object being arranged opposite a center position of said image reception means when said image reception means is in said selected object position; and a control for manually moving said automatic handling device to view the selected object from another perspective when the viewing point of the selected object is not suitable, for maintaining the image reception means with the automatic handling device in a manually selected orientation when the viewing point is suitable, and for storing traveling commands of said automatic handling device.

15. A device in accordance with claim 14, wherein an assigning means is provided for assigning pose data, which determine the pose of an image reception means and are obtained by said measuring means of said automatic handling device, with the particular images recorded in a particular pose by the image reception means.

16. A device in accordance with claim 14, wherein a means for inserting specific virtual information is provided for inserting virtual information into images recorded by the image reception means.

17. A device in accordance with claim 14, wherein said measuring means of said automatic handling device has angle sensors integrated in robot axles of said automatic handling device.

18. A device in accordance with claim 14, wherein said image reception means is an optical display.

19. A device in accordance with claim 18, wherein the camera is arranged on said automatic handling device, which is programmed especially to perform a task.

20. A device in accordance with claim 14, wherein said image reception means is a camera.

21. A device in accordance with claim 14, wherein a measuring means for determining the site and the position of a said image reception means arranged separately from said automatic handling device is arranged on said automatic handling device.

22. A device in accordance with claim 14, further comprising fixed marks in space as well as on said measuring means arranged on said automatic handling device, for determining the pose of said automatic handling device relative to said marks.

23. A device in accordance with claim 14, wherein at least one said mark is arranged on said automatic handling device as well as at least one said measuring means, which is arranged independently from said automatic handling device, such as a camera or at least one sensor, for receiving the pose of the said automatic handling device in the space.

24. A device in accordance with claim 14, wherein a mark is arranged on said automatic handling device as well as said measuring means, which is arranged on another said automatic handling device, such as a camera or a sensor, for determining the relative positions of the said two automatic handling devices.

25. A process for determining the orientation and position of an image reception means, the process comprising:
- providing an image reception means;
- recording an image with said image reception means;
- providing a robot, said robot comprising a measuring means;
- determining a pose of the image reception means with said measuring means of said robot;
- providing an augmented reality system, said augmented reality system comprising an image-generating component;
- delivering said determined pose of said image reception means and said recorded image into said image-generating component of said augmented reality system;
- superimposing a virtual image on said recorded image of said augmented reality system to form a superimposed image;
- displaying said superimposed image via said augmented reality system;
- the user selecting at least one object in said superimposed image;
- changing an orientation of said image reception means such that said orientation of said image reception means corresponds to a position of said selected object in said superimposed image, said selected object being arranged in a center position of said recorded image;
- manually moving said automatic handling device to view the selected object from another perspective when the viewing point of the selected object is not suitable;
- maintaining the image reception means with the automatic handling device in a manually selected orientation when the viewing point is suitable; and
- storing traveling commands of said automatic handling device.

* * * * *